(12) United States Patent
Sanders et al.

(10) Patent No.: US 9,021,701 B1
(45) Date of Patent: May 5, 2015

(54) FERRULE, HOSE COUPLING, AND METHODS OF MAKING SAME

(71) Applicants: John D. Sanders, Springfield, MO (US); Randy C. Foster, Strafford, MO (US)

(72) Inventors: John D. Sanders, Springfield, MO (US); Randy C. Foster, Strafford, MO (US)

(73) Assignee: Dayco IP Holdings, LLC, Springfield, MI (US)

( * ) Notice: Subject to any disclaimer, the term of this patent is extended or adjusted under 35 U.S.C. 154(b) by 196 days.

(21) Appl. No.: 13/626,976

(22) Filed: Sep. 26, 2012

Related U.S. Application Data

(60) Provisional application No. 61/539,225, filed on Sep. 26, 2011.

(51) Int. Cl.
*B21D 39/00* (2006.01)
*B23P 19/04* (2006.01)
*F16L 33/213* (2006.01)
*F16L 33/207* (2006.01)
*H01R 13/622* (2006.01)

(52) U.S. Cl.
CPC ............ *F16L 33/213* (2013.01); *H01R 13/622* (2013.01); *F16L 33/2076* (2013.01); *F16L 33/2078* (2013.01)

(58) Field of Classification Search
CPC . F16L 33/213; F16L 33/2078; F16L 33/2076; F16L 33/2073
USPC ........... 29/890.14, 450, 455.1, 508, 515, 521; 138/109, 110; 285/256, 259, 330; 439/321, 277
See application file for complete search history.

(56) References Cited

U.S. PATENT DOCUMENTS

| | | | | |
|---|---|---|---|---|
| 3,347,571 | A * | 10/1967 | New | 285/222.4 |
| 3,590,455 | A * | 7/1971 | Harris | 29/890.144 |
| 4,305,608 | A | 12/1981 | Stuemky et al. | |
| 4,366,841 | A | 1/1983 | Currie et al. | |
| 4,498,691 | A * | 2/1985 | Cooke | 285/12 |
| 4,544,187 | A * | 10/1985 | Smith | 285/256 |
| 4,564,223 | A | 1/1986 | Burrington | |
| 4,653,779 | A | 3/1987 | Foster | |
| 4,804,212 | A * | 2/1989 | Vyse | 285/256 |
| 5,267,758 | A | 12/1993 | Shah et al. | |
| 5,285,561 | A | 2/1994 | Manning et al. | |
| 5,317,799 | A | 6/1994 | Chapman et al. | |
| 5,380,050 | A * | 1/1995 | Sanders et al. | 285/258 |
| 5,419,028 | A | 5/1995 | Manning et al. | |
| 2010/0187815 | A1* | 7/2010 | Theberath et al. | 285/256 |
| 2013/0082461 | A1* | 4/2013 | Hunter | 285/222.5 |

FOREIGN PATENT DOCUMENTS

GB        571419 A * 9/1944 ............. F16L 35/00

* cited by examiner

*Primary Examiner* — Alexander P Taousakis
(74) *Attorney, Agent, or Firm* — Thompson Hine LLP

(57) ABSTRACT

A lower cost method of manufacturing a ferrule. The method includes cold heading a transition sleeve that includes an annular indented seat therein, providing a penetration sleeve comprising a plurality of inwardly directed and axially spaced apart attachment means for penetrating into a hose when said ferrule is radially inwardly deformed; and brazing the penetration sleeve to the annular indented seat in the transition sleeve. The resulting assembly is visually and functionally blended to become one-piece.

20 Claims, 3 Drawing Sheets

FERRULE, HOSE COUPLING, AND METHODS OF MAKING SAME

RELATED REFERENCES

This application claims the benefit of U.S. Provisional Application No. 61/539,225, filed Sep. 26, 2011.

TECHNICAL FIELD

The present invention relates generally to permanently attachable hydraulic hose couplings and more particularly to a crimp type coupling particularly suited for high pressure, multiple wire ply hoses.

BACKGROUND

Various constructions of crimp type couplings are known, but more cost effective methods of manufacturing are desirable. It is a challenge to make a cost effective hose coupling ferrule that provides proper attachment to the stem through the use of barbs without considerable machining. The stem is the insert portion of the coupling that goes inside a hose, such as a wire reinforced hose, and has a connecter for coupling the hose to a fitting. Machining methods generate considerable scrap material and corresponding costs of machining time. The aforementioned methods are not ideal.

One concern with non-machining methods is the resulting performance and appearance of the coupling.

SUMMARY

One aspect of the invention are methods of forming a two-piece construction into an integral one-piece ferrule. In one embodiment, the method of manufacturing the ferrule includes cold heading a transition sleeve that has an inner surface and an outer surface, a first end that is attachable to a stem, and a second end that has an annular indented seat in the inner surface or the outer surface thereof, providing a penetration sleeve comprising a plurality of inwardly directed and axially spaced apart attachment means for penetrating into a hose when said ferrule is radially inwardly deformed, and brazing the penetration sleeve to the annular indented seat in the transition sleeve. The brazing results in a one-piece ferrule that visually and functionally blends to become one-piece.

In another embodiment, the method may include the steps of forming the transition sleeve without machining, and brazing a penetration sleeve that has a plurality of inwardly directed and axially spaced apart attachment means for penetrating into a hose when said ferrule is radially inwardly deformed to the annular indented seat in the transition sleeve.

In another embodiment, the method may include the steps of cold forming a transition sleeve, the transition sleeve having an inner surface and an outer surface, a first end that is attachable to a stem, and a second end that has an annular indented seat in the inner surface, providing a sintered penetration sleeve comprising a plurality of inwardly directed and axially spaced apart attachment means for penetrating into a hose when said ferrule is radially inwardly deformed, and sintering the penetration sleeve to the annular indented seat in the transition sleeve to form a single-piece ferrule.

In each of the methods disclosed herein the brazing may be copper brazing. Each method may also include the steps of providing a stem and permanently attaching the transition sleeve to the stem to form a hose coupling. The permanently attaching step may include brazing the first end of the transition sleeve to the stem or mechanically deforming the first end into engagement with the stem.

In another aspect of the invention, ferrules are disclosed that include a non-machined transition sleeve having a first end permanently attachable to a stem and having a second end permanently attachable to a penetration sleeve, and a penetration sleeve comprising a plurality of inwardly directed and axially spaced apart attachment means for penetrating into a hose when said ferrule is radially inwardly deformed. The assembled ferrules have the penetration sleeve brazed to the transition sleeve. In one embodiment, the penetration sleeve is copper brazed to the transition sleeve.

DETAILED DESCRIPTION

Figure 1:
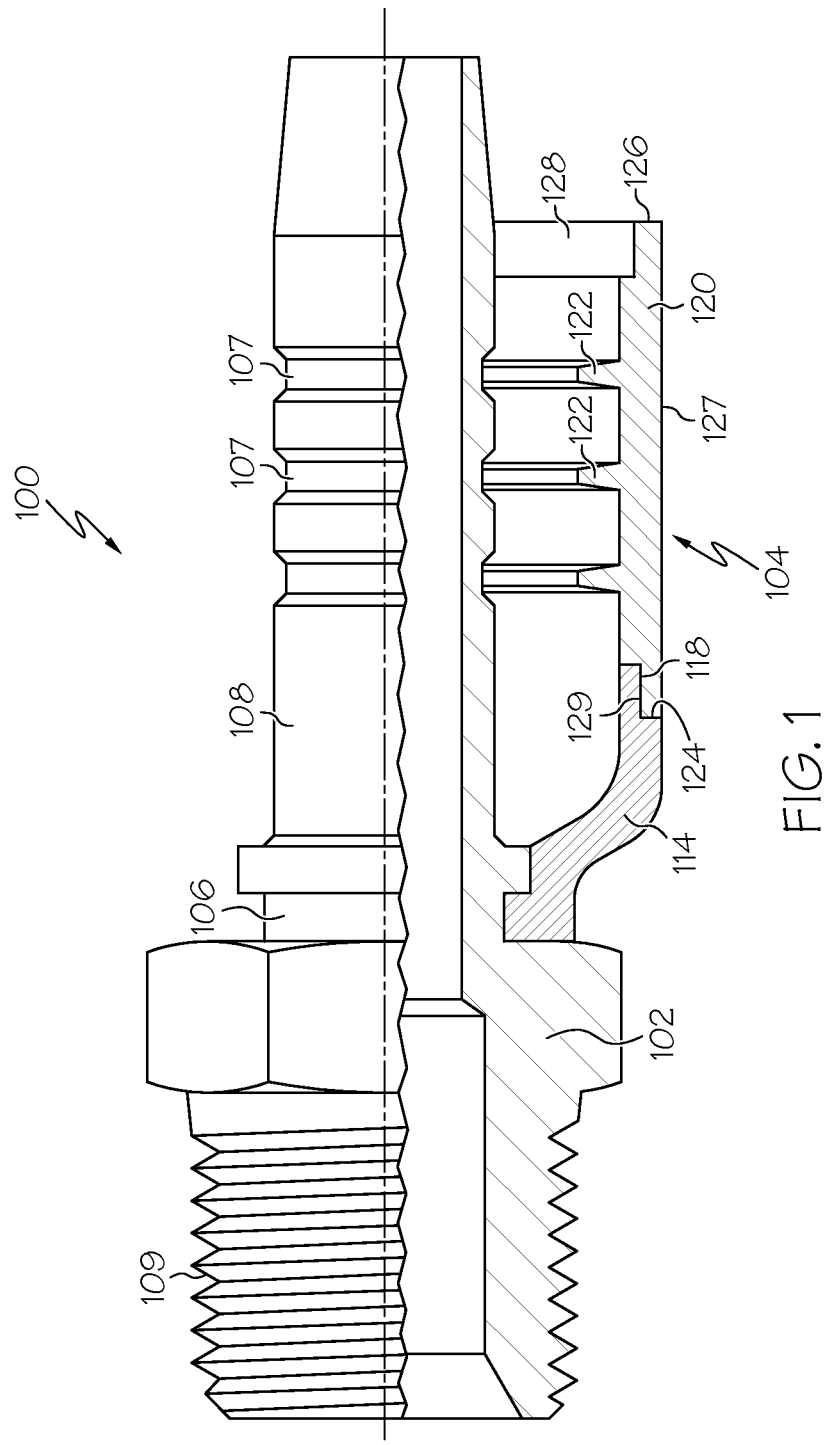
FIG. 1 is a side view of one embodiment of a hose coupling including a partial cross sectional view of a ferrule and stem assembly.
Figure 2:
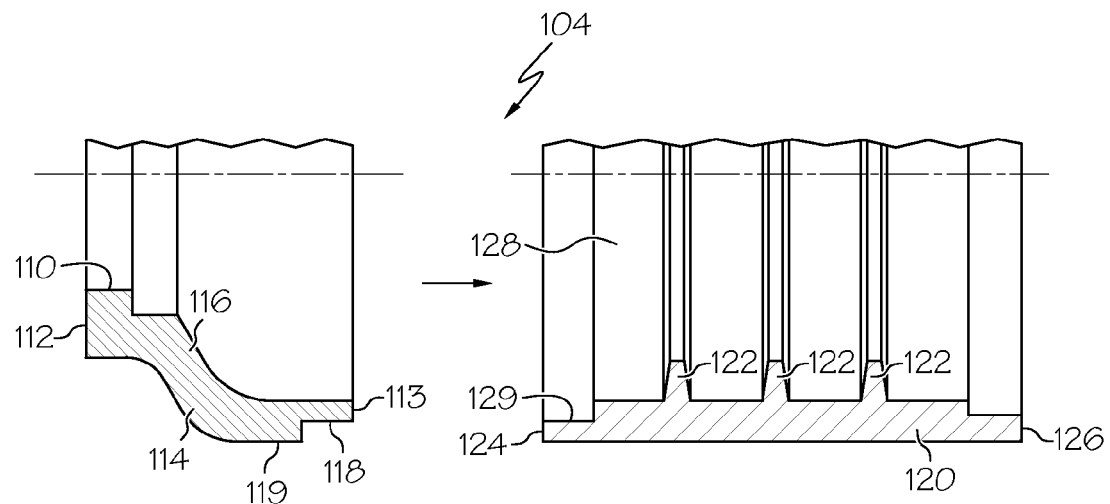
FIG. 2 is a partial side, cross-sectional view of the two-piece ferrule of FIG. 1.
Figure 3:
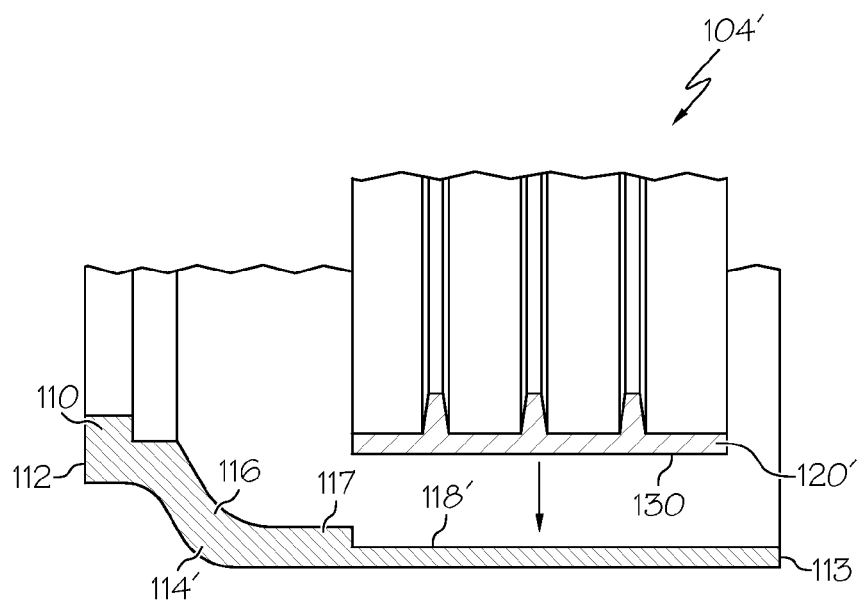
FIG. 3 is a partial side, cross-sectional view of an alternate embodiment of a two-piece ferrule that is attachable to the stem similar to the stem of FIG. 1.
Figure 4A:
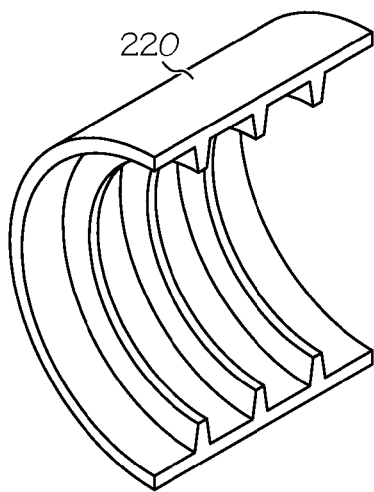
FIG. 4A is a perspective view of one-half of a penetration sleeve.
Figure 4B:
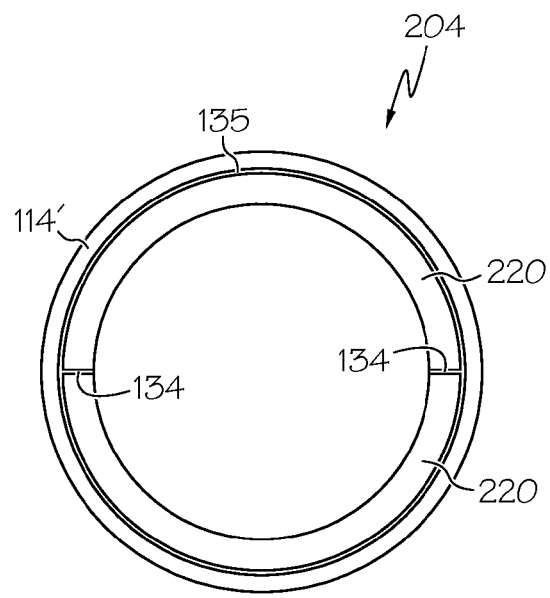
FIG. 4B is an end plan view of a ferrule having a two-piece penetration sleeve formed of the piece shown in FIG. 4A.
Figure 5:
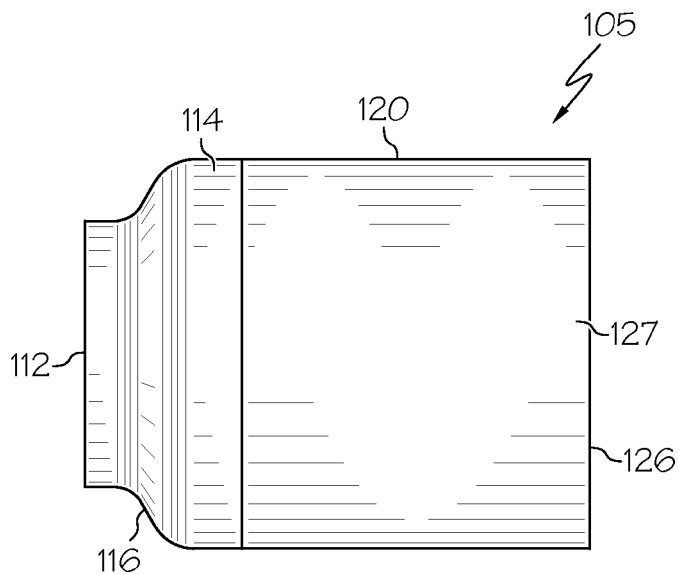
FIG. 5 is a side view of the ferrule of FIG. 1.

Couplings are disclosed herein that include a ferrule that is cheaper to manufacture, but is still capable of withstanding hydrostatic pressures greater than four times the working pressures of the hose. The coupling in FIG. 1 is generally indicated as coupling 100. Coupling 100 includes a stem 102 and a ferrule 104. The stem 102 may be any now and hereinafter commercially available stem for coupling to a hose such as those used in hydraulic systems. The stem 102 includes an annular groove 106 for attachment to the ferrule 104 and has an insert 108 that includes sealing features 107 for sealingly engaging the inside surface of a hose (not shown) when the ferrule 104 is crimped against the hose. At the end opposite from the insert 108, the stem 102 includes connector means 109 for connecting to a fitting (not shown) such as those used in a hydraulic circuit. The ferrules 104 in FIGS. 1-2 are two-piece deformable ferrules that include a transition sleeve 114 and a penetration sleeve 120, that, once assembled, form an integral one-piece shell 105 as seen in FIG. 5. The ferrules 104 are typically deformed by crimping to engage the hose, but are not limited thereto. FIG. 3 is an alternate embodiment of a two-piece deformable ferrule 104' that fully encapsulates the penetration sleeve 120'. Alternately, as shown in FIGS. 4A and 4B, the ferrule 204 may comprise a penetration sleeve 220 comprising a plurality of pieces 220, 220 that are permanently couplable to the transition sleeve 114.

The ferrule 104 in FIGS. 1 and 2 is a two-piece ferrule that includes a single-piece penetration sleeve 120 permanently coupled to the transition sleeve 114. The transition sleeve 114 is a metal, non-machined piece formed by cold forming, sintering, or die-casting. This piece has a first end 112 that includes a flange 110 that is mateable to the annular groove 106 of the stem 102, a second end 113 that has an annular indented seat 118 in the outer surface 119 thereof, and a bell-shaped body 116 between the first end 112 and the second end 113. The bell-shaped body 116 is wider at the second end 113 than at the first end 112 so that the annular indented seat 118 is mateable with the penetration sleeve 104.

The penetration sleeve 104 of FIGS. 1 and 2 is generally tubular in shape with an open first end 124 and an open second end 126. The penetration sleeve 104 has a generally uniform diameter except where a plurality of inwardly directed and axially spaced apart attachment means 122 for penetrating into a hose are formed on the interior surface 128 thereof and where the first end 124 includes a collar 129 for mating with the annular indented seat 118 of the transition sleeve 114. The attachment means 122 may be any construction sufficient to penetrate the covering of the hose or contact and deform a hose's wire reinforcement and force a compression of the inside of the hose against the sealing features 107 of the stem 102 (FIG. 1). In one embodiment, the attachment means 122 includes barbs capable of penetrating a hose. In another embodiment, the attachment means 122 includes axially spaced apart ribs. The ribs may be oriented circumferentially about the inner surface 128 of the penetration sleeve 120 and, if so, are spaced apart for alignment with the sealing features 107 of the stem 102. While ribs are illustrated in FIGS. 1 and 2, the attachment means are not limited thereto. The attachment means may be as disclosed in U.S. Pat. No. 5,419,028, U.S. Pat. No. 5,316,799, U.S. Pat. No. 5,285,561, U.S. Pat. No. 5,267,758, U.S. Pat. No. 4,653,779, U.S. Pat. No. 4,564,223, U.S. Pat. No. 4,366,841, and U.S. Pat. No. 4,305,608, which are each incorporated herein by reference.

The embodiment illustrated in FIG. 3 is another two-piece ferrule 104' that includes a transition sleeve 114' and a penetration sleeve 120'. The transition sleeve 114' is generally similar to transition sleeve 114 of FIGS. 1 and 2, but its annular indented seat 118' is in the inner surface 117 thereof and is an elongate seat 118' that encapsulates the penetration sleeve 120'. In one embodiment, the seat 118' is at least as long as the penetration sleeve 120'. The penetration sleeve 120' is generally similar to the penetration sleeve 120 of FIGS. 1 and 2, but no collar 129 is needed. Instead, the exterior surface 130 of the penetration sleeve 120' mates directly with the annular indented seat 118'.

For the embodiments in FIGS. 1-3 the penetration sleeves 120, 120' may be a formed tube or a minimally machined tube of metal. In one embodiment, the penetration sleeves 120, 120' may be machined from tubing of minimal wall thickness to minimize the scraps generated by the machining process. In another embodiment, the penetration sleeves 120, 120' may be roll formed from tubing.

The ferrule 120 may be manufactured by providing a cold formed transition sleeve 114 such as those described above, providing a penetration sleeve 120 such as those described above, and brazing the penetration sleeve 120 to the transition sleeve. The brazing is performed where the annular indented seat 118 of the transition sleeve 114 mates with the collar 129 of the penetration sleeve 120 and results in an integral shell 105 as seen in FIG. 5 that is visually and functionally a one-piece ferrule. The brazing may be copper brazing and the transition sleeve 114 and penetration sleeve 120 may be made of steel. In one embodiment, the penetration sleeve 120 is a non-machined piece. In another embodiment, the penetration sleeve 120 is machined from tubing. In another embodiment, the penetration sleeve 120 is formed by roll forming. The method may also include the step of forming the transition sleeve 114 without machining the piece. For example, the transition sleeve 114 may be cold formed, sintered, or die cast using known techniques.

In another aspect, the method includes providing a stem 102 and permanently attaching the first end 112 of the transition sleeve 114 to the stem to form a coupling. The step of permanently attaching the ferrule 104 to the stem 102 may include brazing the metallic pieces together, for example, by copper brazing. Alternately, this step may include mechanically deforming the first end 112 of the transition sleeve 114 into or onto the stem 102, for example, into the annular groove 106.

The same or similar methods are appropriate for the manufacture of the ferrule 104' of FIG. 3. The transition sleeve 114' may be cold formed steel, sintered, or die cast such that no machining occurred in the formation thereof and the penetration sleeve is brazed thereto, for example, by copper brazing. The penetration sleeve 120' may be a machined piece or a non-machined piece, but if machined, is formed preferably with minimal machining.

In another embodiment, the ferrule is manufactured by cold forming a transition sleeve such as those described above, sintering the attachment means to a penetration sleeve such as those described above, and brazing or sintering the penetration sleeve to the annular indented seat of the transition sleeve to form a single-piece ferrule.

An alternate embodiment of FIG. 3 is illustrated in FIGS. 4A and 4B where the ferrule 204 includes the transition sleeve 114' of FIG. 3, but has a multi-piece penetration sleeve 220. The multi-piece penetration sleeve 220 is illustrated as a two-piece component, but is not limited thereto. The two-piece component has two pieces of generally semi-circular end views as seen in cross-section in FIG. 4B. It is appreciated that the multi-piece penetration sleeve 220 may include three, four, five, or more pieces.

The same or similar methods to those described above are appropriate for the manufacture of the ferrule 204 of FIGS. 4A and 4B. The transition sleeve 114' may be cold formed steel, sintered, or die cast such that no machining occurred in the formation thereof and the multi-piece penetration sleeve 220 is brazed thereto by weld 135 (FIG. 4B), which was formed by copper brazing. The method also includes the step of brazing the individual penetration sleeve pieces 220, 220 to one another and forming welds 134 (FIG. 4B). The individual penetration sleeve pieces 220 may be machined, molded, rolled, or sintered pieces. If machined, it is preferable that the machining is minimal.

It is to be appreciated that the ferrules may be formed with various diameters or other dimensions as appropriate for the particular stem and hose application. In one embodiment, the ferrule may be configured to attach to a hose having a ¼" diameter, a ⅜" diameter, a ½" diameter, etc.

The embodiments of this invention shown in the drawing and described above are exemplary of numerous embodiments that may be made within the scope of the appended claims. It is contemplated that numerous other configurations of the ferrule and hose coupling assemblies and methods of manufacturing may be created taking advantage of the disclosed approach. In short, it is the applicant's intention that the scope of the patent issuing herefrom will be limited only by the scope of the appended claims.

What is claimed is:

1. A method of manufacturing a ferrule, the method comprising:
cold forming a transition sleeve, the transition sleeve having an inner surface and an outer surface, a first end that is attachable to a stem, a second end that has an annular indented seat in the inner surface or the outer surface thereof, and a bell-shaped body extending from the first end to the second end;
providing a penetration sleeve comprising a plurality of inwardly directed and axially spaced apart attachment means for penetrating into a hose when said ferrule is radially inwardly deformed; and brazing the penetration sleeve to the annular indented seat in the transition sleeve to form a one-piece assembly.

2. The method of claim 1 wherein the penetration sleeve is a non-machined piece.

3. The method of claim 1 further comprising machining the penetration sleeve from tubing.

4. The method of claim 1 further comprising roll forming the penetration sleeve.

5. The method of claim 1 wherein the attachment means include barbs capable of penetrating a hose.

6. The method of claim 1 wherein the attachment means include axially spaced apart ribs.

7. The method of claim 1 wherein the annular indented seat is in the inner surface of the transition sleeve and is long enough to encapsulate the penetration sleeve.

8. The method of claim 7 wherein the penetration sleeve comprises two or more pieces brazed to the annular indented seat.

9. The method of claim 1 wherein the ferrule can withstand hydrostatic pressures greater than four times the working pressures of the hose.

10. The method of claim 1 wherein the annular indented seat is on the outer surface of the second end of the transition sleeve.

11. A ferrule prepared by the method of claim 1.

12. A method of manufacturing a ferrule, the method comprising:

forming a transition sleeve without machining, the transition sleeve having an inner surface and an outer surface, a first end that is attachable to a stem, a second end that has an annular indented seat in the inner surface or the outer surface thereof, and a bell-shaped body extending from the first end to the second end; and brazing a penetration sleeve comprising a plurality of inwardly directed and axially spaced apart attachment means for penetrating into a hose when said ferrule is radially inwardly deformed to the annular indented seat in the transition sleeve.

13. The method of claim 12 wherein forming includes cold forming, sintering, or die casting the transition sleeve.

14. The method of claim 12 wherein brazing includes copper brazing.

15. The method of claim 12 further comprising:
providing a stem; and
brazing the first end of the transition sleeve to the stem to form a coupling.

16. The method of claim 15 wherein brazing includes copper brazing.

17. The method of claim 12 wherein the annular indented seat is on the outer surface of the second end of the transition sleeve.

18. A ferrule prepared by the method of claim 12.

19. A method of manufacturing a ferrule, the method comprising:

cold forming a transition sleeve, the transition sleeve having an inner surface and an outer surface, a first end that is attachable to a stem, a second end that has an annular indented seat in the inner surface, and a bell-shaped body extending from the first end to the second end;

providing a sintered penetration sleeve comprising a plurality of inwardly directed and axially spaced apart attachment means for penetrating into a hose when said ferrule is radially inwardly deformed; and sintering the penetration sleeve to the annular indented seat in the transition sleeve to form a single-piece ferrule.

20. The method of claim 19 wherein the penetration sleeve is a non-machined piece.

* * * * *

UNITED STATES PATENT AND TRADEMARK OFFICE
CERTIFICATE OF CORRECTION

PATENT NO. : 9,021,701 B1  
APPLICATION NO. : 13/626976  
DATED : May 5, 2015  
INVENTOR(S) : John D. Sanders and Randy C. Foster It is certified that error appears in the above-identified patent and that said Letters Patent is hereby corrected as shown below:

Title page, item (73) Assignee, reads "Dayco IP Holdings, LLC, Springfield, MI (US)"

It should read:

-- Dayco IP Holdings, LLC, Springfield, MO (US) --

Signed and Sealed this  
Twenty-second Day of December, 2015

Michelle K. Lee  
*Director of the United States Patent and Trademark Office*